United States Patent
Kim et al.

(10) Patent No.: US 8,971,224 B2
(45) Date of Patent: Mar. 3, 2015

(54) MULTI-CARRIERS MANAGING DEVICE AND METHOD AND SLEEP MODE OPERATING METHOD OF TERMINAL

(75) Inventors: Eunkyung Kim, Seoul (KR); Juhee Kim, Daejeon (KR); Hyun-Jae Kim, Incheon (KR); Kyung Soo Kim, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 308 days.

(21) Appl. No.: 13/126,897

(22) PCT Filed: Oct. 30, 2009

(86) PCT No.: PCT/KR2009/006317
§ 371 (c)(1),
(2), (4) Date: Apr. 29, 2011

(87) PCT Pub. No.: WO2010/050764
PCT Pub. Date: May 6, 2010

(65) Prior Publication Data
US 2011/0216684 A1 Sep. 8, 2011

(30) Foreign Application Priority Data
Oct. 30, 2008 (KR) .................. 10-2008-0107177
Oct. 27, 2009 (KR) .................. 10-2009-0102497

(51) Int. Cl.
G08C 17/00 (2006.01)
H04W 4/00 (2009.01)
H04B 1/38 (2006.01)
H04W 52/02 (2009.01)
H04L 5/02 (2006.01)
H04L 27/26 (2006.01)
H04W 36/24 (2009.01)
H04W 72/04 (2009.01)

(52) U.S. Cl.
CPC ............. *H04W 52/0229* (2013.01); *H04L 5/02* (2013.01); *H04L 27/2601* (2013.01); *H04W 36/24* (2013.01); *H04W 52/0206* (2013.01); *H04W 72/042* (2013.01); *H04W 72/0453* (2013.01)
USPC .......................... 370/311; 370/328; 455/574

(58) Field of Classification Search
None
See application file for complete search history.

(56) References Cited

U.S. PATENT DOCUMENTS 5,404,355 A * 4/1995 Raith ............................ 370/311
5,594,943 A * 1/1997 Balachandran ............... 455/436
(Continued)

FOREIGN PATENT DOCUMENTS

CN  1731882 A   2/2006
CN  101277145 A  10/2008
(Continued)

OTHER PUBLICATIONS

Lina Liu et al., Paging Mechanism in Multi-carrier Operation, IEEE C802.16m-08/972r2, Sep. 5, 2008, Huawei Technologies Co.,Ltd.

*Primary Examiner* — Melanie Jagannathan
(74) *Attorney, Agent, or Firm* — Jefferson IP Law, LLP

(57) ABSTRACT

A multi-carriers management device of a communication system supporting multi-carriers requests a terminal attempting to enter a sleep window to change a primary carrier, and transmits a control message to the terminal through the changed primary carrier during the sleep window.

19 Claims, 4 Drawing Sheets

(56) References Cited

U.S. PATENT DOCUMENTS

| | | |
|---|---|---|
| 6,603,979 B1 * | 8/2003 | Hirsch .......................... 455/502 |
| 7,672,250 B2 | 3/2010 | Czaja et al. |
| 2002/0169008 A1 * | 11/2002 | Hiben et al. ................... 455/574 |
| 2004/0097191 A1 * | 5/2004 | Meyer et al. .................. 455/11.1 |
| 2005/0049012 A1 * | 3/2005 | Chang et al. ................... 455/574 |
| 2005/0070340 A1 * | 3/2005 | Kim ................................ 455/574 |
| 2006/0030305 A1 | 2/2006 | Lee et al. |
| 2006/0203766 A1 * | 9/2006 | Kim et al. ..................... 370/328 |
| 2006/0281436 A1 * | 12/2006 | Kim et al. .................... 455/343.2 |
| 2007/0268900 A1 | 11/2007 | Park et al. |
| 2008/0214249 A1 * | 9/2008 | Kim et al. ..................... 455/574 |
| 2010/0323647 A1 * | 12/2010 | Ryu et al. ................... 455/127.5 |

FOREIGN PATENT DOCUMENTS

| | | |
|---|---|---|
| KR | 10-2007-0112573 A | 11/2007 |
| KR | 10-2008-0071553 A | 8/2008 |
| KR | 10-2008-0074698 A | 8/2008 |
| WO | 2006/016765 A2 | 2/2006 |
| WO | 2006/116102 A2 | 11/2006 |
| WO | 2008/000489 A1 | 1/2008 |

* cited by examiner

MULTI-CARRIERS MANAGING DEVICE AND METHOD AND SLEEP MODE OPERATING METHOD OF TERMINAL

TECHNICAL FIELD

The present invention relates to a multi-carriers management method and device, and a sleep mode operation method for a terminal.

BACKGROUND ART

In general, one of multi-carriers is used as a primary carrier and the other is used as a subcarrier.

In a wireless communication system supporting multi-carriers, a base station transmits a control message to a terminal through primary carriers. That is, a traffic indication message for notifying a terminal that has entered a sleep window of whether there are data that will be transmitted by a base station is transmitted to the terminal from the base station through the primary carrier.

However, when primary carriers used by a plurality of terminals that have entered the sleep window are different, the base station has to transmit the traffic indication message by using the primary carriers used by the respective terminals, and hence the radio resource is inefficiently used. Also, the base station increases a load according to transmission of the traffic indication message.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a multi-carriers management method and device for reducing a load caused by message transmission by a base station and efficiently managing multi-carriers, and a sleep mode operation method for a terminal.

Solution to Problem

An exemplary embodiment of the present invention provides a method for a base station of a communication system for supporting multi-carriers to manage multi-carriers, including requesting a first terminal attempting to enter a sleep window to change a primary carrier, and transmitting a control message to the first terminal through the primary carrier that is changed for the sleep window.

Yet another embodiment of the present invention provides a sleep mode operation method of a terminal in a communication system supporting multi-carriers, including receiving a request to change a primary carrier from a base station when entering a sleep window, changing the primary carrier and entering the sleep mode, and receiving a control message from the base station through the changed primary carrier.

Yet another embodiment of the present invention provides a device for managing multi-carriers by a base station of a communication system supporting the multi-carriers, including a communicator for requesting a first terminal attempting to enter a sleep window to change a primary carrier, wherein a control message is transmitted through the changed primary carrier during the sleep window.

Advantageous Effects of Invention

According to an embodiment of the present invention, the multi-carriers are efficiently managed in the wireless communication system for supporting the multi-carriers.

Also, the radio resource is efficiently used by efficiently managing the multi-carriers for the terminal in a power save mode.

MODE FOR THE INVENTION

Figure 1:
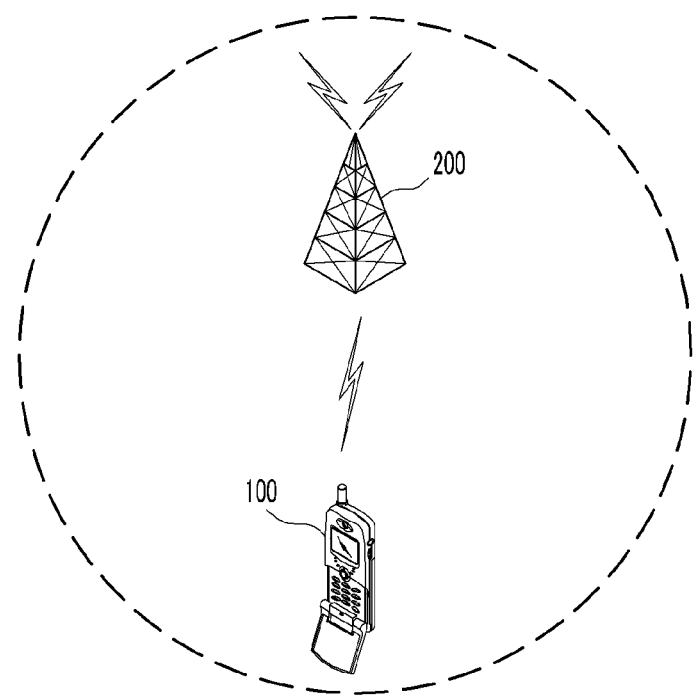
FIG. 1 shows a multi-carriers wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising" will be understood to imply the inclusion of stated elements but not the exclusion of any other elements.

In the specification, a terminal may indicate a mobile station (MS), a mobile terminal (MT), a subscriber station (SS), a portable subscriber station (PSS), user equipment (UE), and an access terminal (AT), and it may include entire or partial functions of the mobile station (MS), the mobile terminal, the subscriber station, the portable subscriber station, the user equipment, and the access terminal.

In the specification, a base station (BS) may indicate an access point (AP), a radio access station (RAS), a nodeB (Node-B), an evolved Node-B (eNB), a base transceiver station (BTS), and a mobile multihop relay (MMR)-BS, and it may include entire or partial functions of the access point, the radio access station, the nodeB, the evolved Node-B, the base transceiver station, and the mobile multihop relay-BS.

A multi-carriers management method and device in a multi-carriers wireless communication system according to an exemplary embodiment of the present invention will now be described with reference to accompanying drawings.

Figure 2:
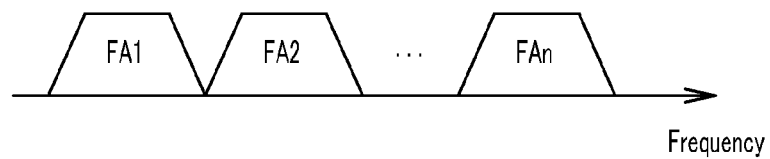
FIG. 2 shows multi-carriers.

FIG. 1 shows a multi-carriers wireless communication system according to an exemplary embodiment of the present invention, and FIG. 2 shows multi-carriers.

Referring to FIG. 1, the multi-carriers wireless communication system includes a terminal 100 and a base station 200.

The terminal 100 is an endpoint of a radio channel, and supports multi-carriers having the frequency bandwidths FA1 to FAn shown in FIG. 2. Therefore, the terminal 100 communicates with the base station 200 by using the multi-carriers with the frequency bandwidths FA1 to FAn.

The base station 200 communicates with the terminal 100 that is provided in a cell area, and includes a multi-carriers management device (not shown) for managing the multi-carriers that are allocated to the terminal 100.

The multi-carriers management device sets one of the multi-carriers to be a primary carrier and the other to be a secondary carrier. The primary carrier represents a carrier that is used to transmit/receive various types of control information and data between the terminal 100 and the base station 200, and the secondary carrier indicates an additional carrier that is used to transmit/receive data while the terminal is transmitting/receiving control information through the primary carrier.

Figure 3:
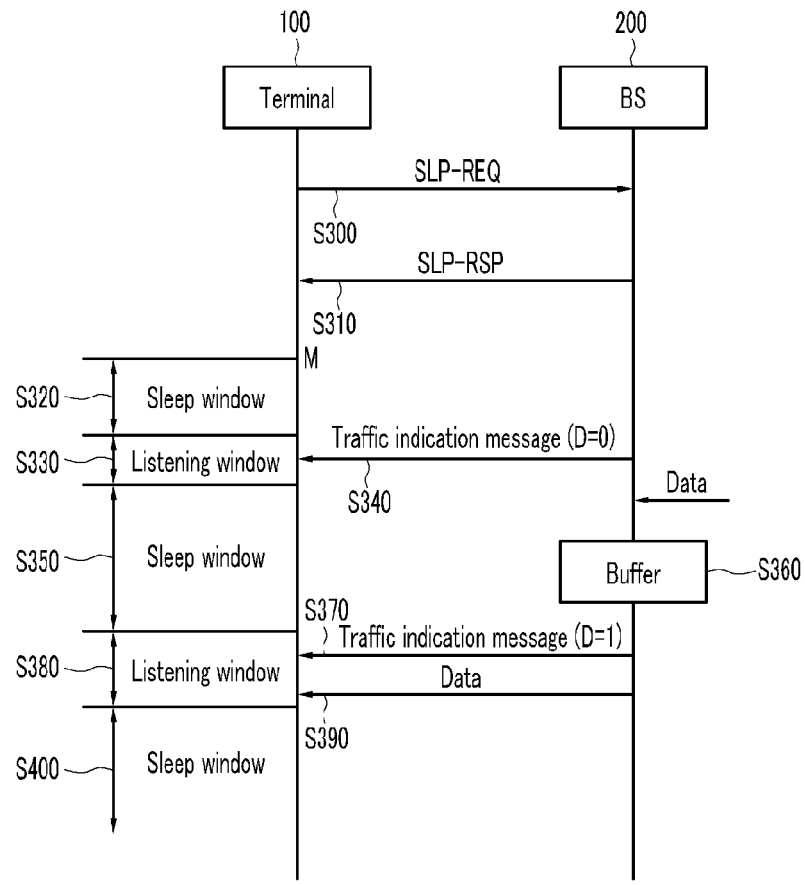
FIG. 3 shows a flowchart of a sleep mode operation for a terminal according to an exemplary embodiment of the present invention.

FIG. 3 shows a flowchart of a sleep mode operation of a terminal according to an exemplary embodiment of the present invention.

Referring to FIG. 3, the terminal 100 attempting to enter the sleep mode sets a sleep period to transmit a sleep mode request message SLP-REQ to the base station 200 (S300). In this instance, the sleep mode request message SLP-REQ may include a minimum sleep window parameter, a maximum sleep window parameter, and a listening window parameter.

Upon receiving the sleep mode request message SLP-REQ, the base station 200 allocates a sleep identifier of the terminal 100, determines the sleep period based on contents that are included in the sleep mode request message SLP-REQ, and transmits a sleep mode response message SLP-RSP to the terminal 100 (S310). In this instance, the sleep mode response message SLP-RSP includes sleep identifier information, sleep start time M, minimum sleep window, and maximum sleep window of the terminal 100.

The terminal 100 having received the sleep mode response message SLP_RSP enters the sleep window during which the terminal 100 receives no data for the sleep window starting from the sleep start time M (S320).

When the sleep window has expired, the terminal 100 enters a listening window (S330). The terminal 100 having entered the listening window receives a traffic indication message for notifying whether there are data that are standing by for transmission during the sleep window from the base station 200 (S340). The terminal 100 checks whether there are data that are standing by for transmission during the sleep period from the base station 200 through the traffic indication message. The traffic indication message is transmitted through the primary carrier that is allocated to the terminal 100.

That is, when there are no data that are standing by for transmission during the sleep window, the base station 200 sets a corresponding field D of the traffic indication message to be 0 and transmits 0 to the terminal 100 (S340), and the terminal 100 enters the sleep window again (S350) when there are no data standing by for transmission during the sleep window according to the result of checking the traffic indication message. In this instance, the sleep window entered by the terminal 100 is set to be equal to or greater than a previous sleep window within the limit of the maximum sleep windows depending on the setting method.

When the sleep window has expired, the terminal 100 enters a listening window (S380).

Meanwhile, there are data that are to be transmitted to the terminal 100 that has entered during the sleep window, the base station 200 buffers the data (S360), and sets the corresponding field D of the traffic indication message to be 1 and transmits the traffic indication message to the terminal 100 and the terminal 100 that has entered in the listening window receives the traffic indication message (S370).

When there are data that are standing by for transmission during the sleep window, the base station 200 transmits data to the terminal 100 in the listening window and the terminal 100 receives the data from the base station 200 in the listening window (S390).

Then, when the listening window has expired, the terminal 100 enters a sleep window (S400).

In addition, when the terminal 100 is managed as a terminal group, the base station 200 sets a group bitmap (not shown) for indicating whether there are data to be transmitted to at least one terminal belonging to the terminal group to the corresponding field, and sets a traffic bitmap (not shown) for indicating whether there are data to be transmitted to each terminal belonging to each terminal group. The base station 200 can display the existence state of the data to be transmitted to the terminal belonging to the terminal group to the group bitmap and the traffic bitmap with bits. For example, when the base station 200 manages 32 terminal groups, each terminal group has 32 terminals, a sleep identifier of the terminal 100 belongs to the first terminal group, and there are data that are to be transmitted to the terminal 100, the base station 200 sets a group bitmap (not shown) to be 32 which corresponds to the number of terminal groups and sets the most significant bit (MSB) for indicating the first terminal group from among 32 bits to be "1" to thereby notify that there are data that will be transmitted to at least one terminal from among the terminals that belong to the first terminal group. The base station 200 sets the traffic bitmap (not shown) to be the 32 bits that correspond to the number of terminals belonging to the first terminal group, and sets the bit for indicating the terminal 100 to be "1" from among the 32 bits to notify that there are data that are to be transmitted to the terminal 100.

Figure 4:
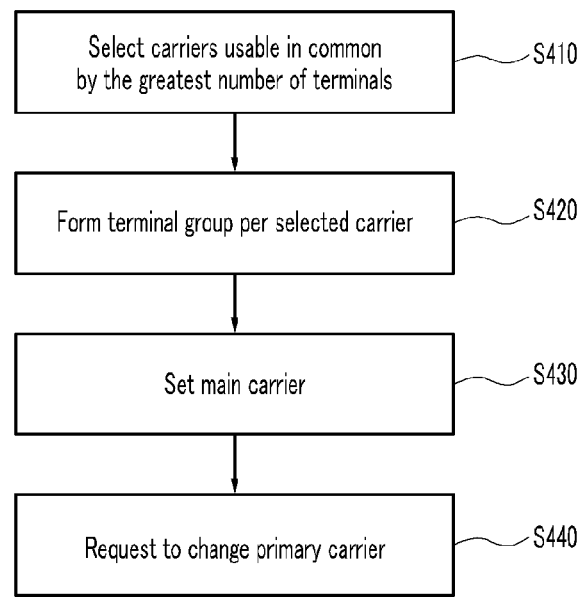
FIG. 4 shows an operation by a carrier management device according to an exemplary embodiment of the present invention.
Figure 5:
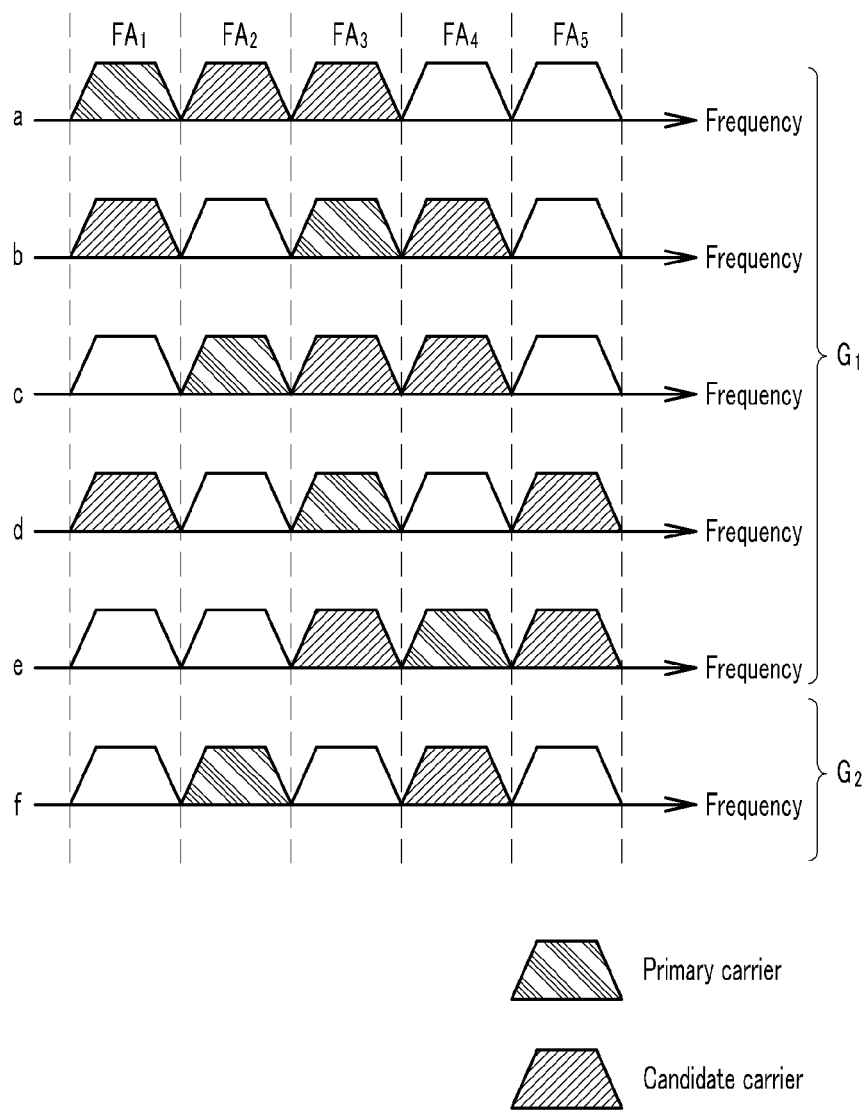
FIG. 5 shows a method for forming a terminal group according to an exemplary embodiment of the present invention.

FIG. 4 shows an operation by a carrier management device according to an exemplary embodiment of the present invention, and FIG. 5 shows a method for forming a terminal group according to an exemplary embodiment of the present invention.

Referring to FIG. 4, when the terminal 100 supporting the multi-carriers attempts to enter the sleep mode, the multi-carriers management device selects the carriers that can be used in common by the greatest number of terminals from among candidate carriers usable by the terminal 100 attempting to enter the sleep mode and candidate carriers usable by the terminal having entered the sleep mode (S410).

The multi-carriers management device groups the terminal 100 attempting to enter the sleep mode for each selected carrier and the terminals having entered the sleep mode to form a terminal group (S420), and sets the selected carrier to be the primary carrier of the terminals belonging to each terminal group (S430).

The multi-carriers management device transmits information on the selected carrier to request the terminal belonging to each terminal group to change the current primary carrier (S440).

The multi-carriers management device may not transmit the information on the selected carrier to the corresponding terminal when the carrier selected from among the terminal belonging to the terminal group is set to be the primary carrier.

For example, it is assumed that the cell area managed by the base station 200 has 6 terminals a, b, c, d, e, and f, carriers and primary carriers available by the terminals a, b, c, d, e, and f are set as shown in FIG. 5, the terminals b, c, d, e, and f have entered the sleep window, and the terminal a attempts to enter the sleep window.

The multi-carriers management device selects the carriers that are usable in common by the greatest number of terminals from among the multi-carriers FA1 to FA5 based on the candidate carriers FA1, FA2, and FA3 that are usable as primary carriers by the terminal a attempting to enter the sleep window and the candidate carriers FA1, FA3, FA4/FA2, FA3, FA4/FA1, FA3, FA5/FA3, FA4, FA5/FA2, FA4 that are usable as primary carriers by the terminals b/c/d/e/f having entered the sleep window. In this instance, since the carrier FA3 is used in common by the greatest number of terminals a, b, c, d, and e, the terminals a, b, c, d, and e that can use the carrier FA3 are formed to be a single terminal group G1, and the other terminal f is formed to be another terminal group G2.

The multi-carriers management device sets the carrier FA3 to be the primary carrier of the terminals a, b, c, d, and e belonging to the terminal group G1 in the case of the terminal group G1, and maintains the primary carrier FA2 that is set for the terminal f in the case of the terminal group G2. The multi-carriers management device transmits information on the carrier FA3 that is selected through the sleep mode response message SLP-RSP to the terminal a attempting to enter the sleep window to request to change the primary carrier, and it transmits information on the carrier FA3 that is selected through a media access control (MAC) management message during the listening window to the terminals b, c, d, and e having entered the sleep window to request to change the primary carrier. In this instance, it is possible to add a field to the sleep mode response message SLP-RSP and the MAC management message, and include the information on the selected carrier FA3 in the added field.

The terminal a attempting to enter the sleep window from among the terminals a, b, c, d, and e belonging to the terminal group G1 changes the primary carrier with the carrier FA3 and enters the sleep window, and the terminals b, c, d, and e having entered the sleep window from among the terminals a, b, c, d, and e belonging to the terminal group G1 changes the primary carrier with the carrier FA3 during the listening window. In this instance, in the case of the terminals b and d, the multi-carriers management device can request the terminals a, c, and e to change the primary carrier since the carrier FA3 is set to be the primary carrier.

Accordingly, the base station 200 can transmit the traffic indication message by using a single carrier FA3 to the respective terminals a, b, c, d, and e belonging to the terminal group G1, and so the other carrier can be used for another purpose, thereby enabling efficient management of the multi-carriers.

Further, when the base station 200 transmits the traffic indication message once by using a single carrier FA3, the respective terminals a, b, c, d, and e belonging to the terminal group G1 can check the traffic indication message, and the load caused by transmission of the traffic indication message by the base station 200 is reduced.

Figure 6:
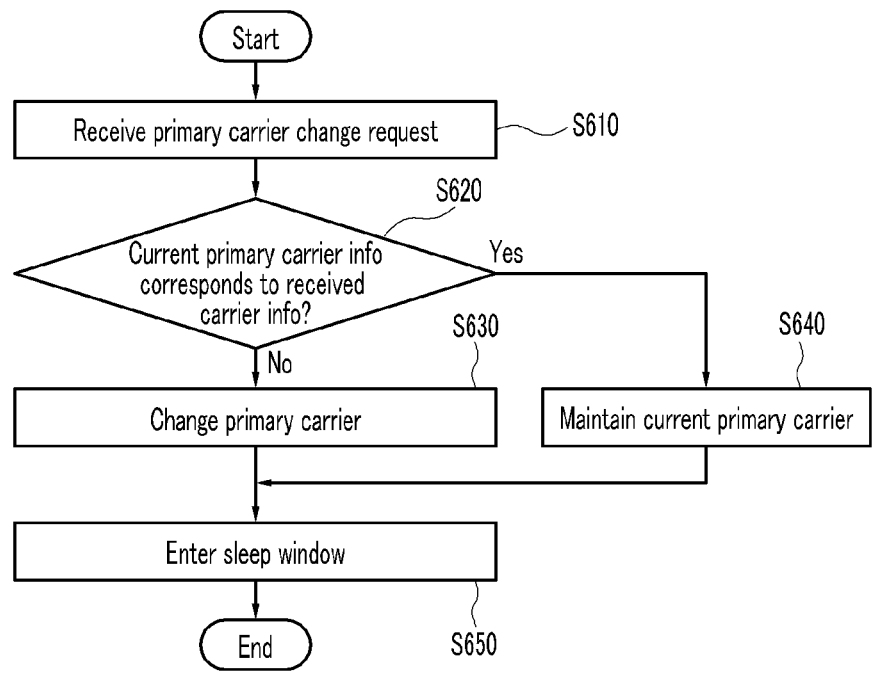
FIG. 6 shows a flowchart of a method for a terminal according to an exemplary embodiment of the present invention to change a primary carrier.

FIG. 6 shows a flowchart of a method for a terminal according to an exemplary embodiment of the present invention to change a primary carrier.

Referring to FIG. 6, the terminal 100 attempting to enter the sleep mode receives the primary carrier change request by receiving information on the selected carrier from the base station 200 (S610). For example, in the case of the terminal a attempting to enter the sleep window, information on the selected carrier can be included in the sleep mode response message SLP-RSP, and the terminal a can receive a primary carrier change request by receiving a sleep mode response message from the base station. In the case of the terminals b, c, d, and e having entered the sleep window, information on the selected carrier may be included in the MAC management message during the listening window, and the terminals b, c, d, and e can receive a primary carrier change request through receipt of the MAC management message.

The terminal 100 determines whether the current primary carrier information established to the terminal 100 corresponds to information on the carrier that is transmitted by the base station 200 (S620).

When the current primary carrier information does not correspond to the carrier information provided by the base station 200, the terminal 100 changes the primary carrier with the carrier that corresponds to the information on the carrier provided by the base station 200 (S630), and enters the sleep mode (S650). When the current primary carrier information corresponds to the carrier information provided by the base station 200, the terminal 100 maintains the established primary carrier (S640) and enters the sleep mode (S650).

The terminal having entered the sleep mode performs the same operation as the terminal 100 attempting to enter the sleep mode, thereby changing the primary carrier and maintaining the current primary carrier.

Figure 7:
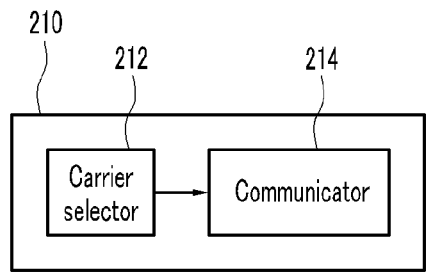
FIG. 7 shows a schematic diagram of a carrier management device according to an exemplary embodiment of the present invention.

FIG. 7 shows a schematic diagram of a carrier management device according to an exemplary embodiment of the present invention.

Referring to FIG. 7, a multi-carriers management device 210 includes a carrier selector 212 and a communicator 214.

The carrier selector 212 selects carriers that are usable in common by the greatest number of terminals from among the terminals attempting to enter the sleep window and the terminals having entered the sleep window from among the candidate sub-carriers that are usable by the terminal attempting to enter the sleep window and the subcarriers that are usable by the terminals having entered the sleep window among the terminals belonging to the cell area covered by the base station 200.

The carrier selector 212 groups the terminals attempting to enter the sleep window and the terminals having entered the sleep window for respective selected carriers as a terminal group, and sets the selected carrier to be the primary carrier to be used by the terminal of each terminal group.

The communicator 214 transmits carrier information selected by the terminal group to the terminal to request to change the primary carrier. In this instance, the communicator 214 can include information on the selected carrier in the sleep mode response message SLP-RSP to request the terminal attempting to enter the sleep window to change the primary carrier, and can include information on the selected carrier in the MAC management message to request the terminal having entered the sleep window to change the primary carrier.

The base station 200 transmits the traffic indication message to the terminal 100 by using the primary carrier.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for a base station of a communication system for supporting multi-carriers to manage the multi-carriers, comprising:
    selecting a carrier, the selected carrier being the carrier, from among the supported multi-carriers, that is determined to be usable in common by the greatest number of terminals among a first terminal that is currently attempting to enter a sleep window and a plurality of second terminals having entered the sleep window;
    requesting the first terminal to change a primary carrier from a current primary carrier to the selected carrier; and
    transmitting a control message to the first terminal through the primary carrier that is changed to be the selected carrier for the sleep window.

2. The method of claim 1, wherein the control message includes a traffic indication message.

3. The method of claim 1, wherein the requesting of the first terminal includes:
    requesting the first terminal to change the selected carrier as the primary carrier when the first terminal can use the selected carrier.

4. The method of claim 3, wherein requesting of the first terminal includes: transmitting a sleep mode response message including information on the selected carrier to the first terminal.

5. The method of claim 1, further including requesting at least one of the plurality of second terminals having entered the sleep window during a listening window to change the primary carrier.

6. The method of claim 5, further comprising requesting the at least one second terminal to change the selected carrier as a primary carrier when the at least one second terminal can use the selected carrier.

7. The method of claim 6, wherein requesting of the at least one second terminal includes transmitting a media access control (MAC) management message including information on the selected carrier to the at least one second terminal.

8. A sleep mode operation method of a first terminal to enter a sleep window in a communication system supporting multi-carriers, comprising:
    receiving a request to change a primary carrier from a current primary carrier to a selected carrier from a base station when the terminal is currently entering a sleep window;
    changing the primary carrier to the selected carrier and entering a sleep mode; and
    receiving a control message from the base station through the changed primary carrier,
    wherein the request includes information on the primary carrier to be changed, and
    wherein the selected carrier is selected from among the supported multi-carriers and is determined to be usable in common by the greatest number of terminals from among the first terminal and a plurality of second terminals having entered the sleep window.

9. The sleep mode operation method of claim 8, wherein the control message includes a traffic indication message.

10. The sleep mode operation method of claim 8, wherein the receiving of a request includes receiving a sleep mode response message including information on a primary carrier to be changed from the base station.

11. The sleep mode operation method of claim 8, further including receiving a request to change the primary carrier from the base station during a listening window after the sleep window.

12. The sleep mode operation method of claim 11, wherein receiving of a request to change the primary carrier from the base station during a listening window includes receiving a media access control (MAC) management message including information on the primary carrier to be changed from the base station.

13. The sleep mode operation method of claim 8, wherein the control message is received during a listening window after the sleep window.

14. A device for managing multi-carriers by a base station of a communication system supporting the multi-carriers, comprising:
    a carrier selector for selecting a carrier, the selected carrier being the carrier, from among the supported multi-carriers, that is determined to be usable in common by the greatest number of terminals from among a first terminal that is currently attempting to enter a sleep window and a plurality of second terminals having entered the sleep window; and
    a communicator for requesting the first terminal to change a primary carrier from a current primary carrier to a selected carrier,
    wherein a control message is transmitted through the changed primary carrier during the sleep window.

15. The device of claim 14, wherein the control message includes a traffic indication message.

16. The device of claim 14, wherein the communicator includes information on the selected carrier in the sleep mode response message and transmits the same to the first terminal.

17. The device of claim 14, wherein the communicator requests at least one of a plurality of second terminals having entered the sleep window to change the primary carrier during a listening window.

18. The device of claim 17, wherein the communicator requests the at least one second terminal to change the primary carrier with the selected carrier when the at least one second terminal can use the selected carrier.

19. The device of claim 18, wherein the communicator includes information on the selected carrier in the media access control (MAC) management message and transmits the same to the at least one second terminal.

* * * * *